(12) United States Patent
Sakata et al.

(10) Patent No.: US 7,497,800 B2
(45) Date of Patent: Mar. 3, 2009

(54) METHOD OF OPERATING A VEHICLE ELECTRIC MOTOR

(75) Inventors: Takatoshi Sakata, Yamatotakada (JP); Yasuhiro Yukitake, Nara (JP); Yasuo Asai, Kashiwara (JP); Kouji Yoshinami, Kashiba (JP)

(73) Assignee: JTEKT Co., Ltd., Osaka (JP)

( * ) Notice: Subject to any disclaimer, the term of this patent is extended or adjusted under 35 U.S.C. 154(b) by 319 days.

(21) Appl. No.: 10/573,296

(22) PCT Filed: Sep. 22, 2004

(86) PCT No.: PCT/JP2004/013778

§ 371 (c)(1),
(2), (4) Date: May 15, 2006

(87) PCT Pub. No.: WO2005/031193

PCT Pub. Date: Apr. 7, 2005

(65) Prior Publication Data

US 2007/0065296 A1    Mar. 22, 2007

(30) Foreign Application Priority Data

Sep. 26, 2003   (JP)   ............... 2003-335843

(51) Int. Cl.
*F16H 38/00* (2006.01)
(52) U.S. Cl. ...................................... 475/136
(58) Field of Classification Search ............... 417/213; 475/136, 149, 159; 180/338, 339; 290/40 C
See application file for complete search history.

(56) References Cited

U.S. PATENT DOCUMENTS

| | | | | |
|---|---|---|---|---|
| 4,275,617 A | * | 6/1981 | Kalns | ........................ 475/136 |
| 5,944,632 A | * | 8/1999 | Hara et al. | ................... 477/158 |
| 6,110,072 A | * | 8/2000 | Harada et al. | ............... 477/157 |
| 6,390,947 B1 | * | 5/2002 | Aoki et al. | ..................... 477/3 |
| 6,482,127 B2 | * | 11/2002 | Katou | ........................ 477/192 |
| 6,565,473 B2 | * | 5/2003 | Endo et al. | ................... 475/117 |
| 6,647,326 B2 | * | 11/2003 | Nakamori et al. | ............. 701/22 |
| 6,692,402 B2 | * | 2/2004 | Nakamori et al. | ............... 477/3 |
| 6,716,138 B2 | * | 4/2004 | Matsubara et al. | .......... 477/167 |
| 6,760,655 B2 | * | 7/2004 | Matsubara et al. | ............ 701/54 |
| 6,769,502 B2 | * | 8/2004 | Nakamori et al. | .......... 180/65.2 |
| 6,799,109 B2 | * | 9/2004 | Nakamori et al. | ............. 701/54 |
| 6,805,647 B2 | * | 10/2004 | Silveri et al. | ................... 475/4 |
| 6,840,889 B2 | * | 1/2005 | Aoki et al. | ................... 477/156 |
| 6,913,558 B2 | * | 7/2005 | Mori et al. | ..................... 477/3 |

(Continued)

FOREIGN PATENT DOCUMENTS

JP     HEI9-32738     2/1997

(Continued)

*Primary Examiner*—Dirk Wright
(74) *Attorney, Agent, or Firm*—Jordan and Hamburg LLP

(57) ABSTRACT

In a method of operating an electric motor which drives an auxiliary oil pump for supplying a hydraulic pressure of an ATF to a transmission, only at an idle stop of an engine via a rotation shaft pivotally supported by ball bearings, the electric motor is rotated at a very low speed or in an intermittent manner when an automobile is traveling and the auxiliary oil pump is not used. According to the configuration, the electric motor is slightly rotated during when the automobile is traveling, whereby impressions are prevented from being formed on the ball bearings.

8 Claims, 4 Drawing Sheets

U.S. PATENT DOCUMENTS

| | | | |
|---|---|---|---|
| 7,028,794 B2 * | 4/2006 | Odahara et al. | 180/65.2 |
| 7,041,030 B2 * | 5/2006 | Kuroda et al. | 477/21 |
| 7,055,486 B2 * | 6/2006 | Hoff et al. | 123/196 R |
| 7,314,425 B2 * | 1/2008 | Ito et al. | 477/5 |

FOREIGN PATENT DOCUMENTS

| | | |
|---|---|---|
| JP | 2000-296720 | 10/2000 |
| JP | 2001-317623 | 11/2001 |
| JP | 2002-213594 | 7/2002 |
| JP | 2004-84742 | 3/2004 |
| JP | 2003-23524 | 8/2004 |

* cited by examiner

METHOD OF OPERATING A VEHICLE ELECTRIC MOTOR

BACKGROUND OF THE INVENTION

The present invention relates to a method of operating a vehicle electric motor for driving vehicle-mounted driven equipment such as an auxiliary oil pump which supplies a hydraulic pressure of an ATF to a transmission at, for example, an idle stop of an engine, in order to protect a rolling bearing which pivotally supports a rotation shaft of the electric motor.

In an automobile having an AT (Automatic Transmission), as shown in FIG. 3, the rotation of an engine 1 which is an internal combustion engine is usually changed in speed by a transmission 3 via a torque converter 2, and transmitted to driving wheels which are not shown. The transmission 3 uses an ATF (Automatic Transmission Fluid) as a hydraulic pressure for speed change, and lubrication. The ATF is circulatively supplied from a drain 5 to the transmission 3 by a main oil pump 4 which operates with using the rotation of the engine 1 as a driving force. Although illustration is omitted, also the torque converter 2 receives a supply of the ATF as a power transmission medium fluid from the main oil pump 4. In the figure, $I_1$ indicates various kinds of drive information, and $P_1$ indicates a driving power source at an idle stop.

Among such automobiles, there is an automobile which is equipped with an idle stop function of, in idling operation of the engine 1, stopping the engine 1 by an idle stop controller 6, thereby intending to improve the fuel efficiency and conserve the environment. The idle stop controller 6 controls the engine 1 on the basis of various kinds of drive information such as the travel speed of the automobile, the position of a select lever, and an operation on a pedal. At stopping of the automobile due to a stoplight, a traffic jam, or the like, such as the case where a brake pedal is depressed and the automobile is stopped while being gradually decelerated, the engine 1 is stopped.

When it is predicted that traveling is again started, such as the case where the foot gets off the brake pedal, the engine 1 is restarted. When it is predicted that traveling is immediately restarted, such as the case where the automobile is suddenly stopped, or when the burden of restart of the engine 1 is large, such as the case where the temperature of the engine 1 is low, or the remaining battery capacity is small, the engine 1 is not stopped.

When the engine 1 is stopped by the idle stop function during stopping of the automobile, however, the main oil pump 4 is caused not to operate, and the supply of the ATF to the transmission 3 and the like is cut off so that the hydraulic pressure is lowered. In a situation such as that an acceleration pedal is depressed down immediately after the engine 1 is restarted, even when the supply of the ATF is restarted by the main oil pump 4, the hydraulic pressure is not instantly restored. Consequently, there is a case where smooth restart of traveling is disabled because, for example, the engine 1 once enters the idling state and the automobile is then suddenly started by the restored hydraulic pressure.

In order to comply with this, conventionally, the supply of the ATF is performed also by an auxiliary oil pump 8 driven by an electric motor 7, in addition to the main oil pump 4, so that, when the engine 1 is stopped by the idle stop function, the hydraulic pressure can be maintained by the auxiliary oil pump 8. Namely, when the engine 1 is stopped by the idle stop function, the idle stop controller 6 supplies the driving power source to the electric motor 7 to cause the auxiliary oil pump 8 to operate, during a period when the engine 1 is stopped.

Various configurations in which the electric motor 7 and the auxiliary oil pump 8 are integrated with each other to facilitate installing of them into an automobile have been proposed (for example, see Japanese Patent Publication (Kokai) No. HEI9-32738).

The applicant has already proposed an electric pump in which, as shown in FIG. 4, the electric motor 7 and the auxiliary oil pump 8 are integrated with each other, and a rotation shaft 9 that is shared by the electric motor 7 and the auxiliary oil pump 8 is pivotally supported at the both ends by ball bearings 10, 11 (see Japanese Patent Application No. 2003-23524 "Electric internal gear pump"). In the electric motor 7 of the electric pump, permanent magnets 7a are placed in the rotor, and coils 7c are wound around a core 7b of the stator. The motor is used as a sensorless motor. As the auxiliary oil pump 8, a trochoid pump is used in which an inner rotor 8b having an external gear meshes with the inner peripheral side of an outer rotor 8a having an internal gear, and the rotors 8a, 8b are placed eccentrically and rotatably.

In the case where the above-described electric pump is used as the electric motor 7 and auxiliary oil pump 8 having the idle stop function shown in FIG. 3, only when the automobile is stopped, the electric motor 7 is rotated by the idle stop controller 6, and, during traveling of the automobile, the electric motor 7 is always stopped.

In the ball bearings 10, 11 which pivotally support the rotation shaft 9 of the electric motor 7 and the auxiliary oil pump 8, during a period when the rotation shaft 9 is stopped, however, plural balls 10a, 11a which are rolling elements are stopped on raceway surfaces of outer rings 10b, 11b and inner rings 10c, 11c. When, in this state, repeatedly subjected to vibrations due to traveling of the automobile, the balls 10a, 11a repeatedly collide against the same places of the raceway surfaces, so that impressions are easily formed. In the rotor of the electric motor 7, particularly, the shaft diameter is often increased in order to obtain a larger torque. Since the permanent magnets 7a shown in FIG. 3, and the like are placed, the rotation shaft 9 has a relatively heavy weight. Therefore, impacts which are produced when the balls 10a, 11a receiving vibrations collide against the raceway surfaces are large.

In the case where the rotation shaft 9 of the electric motor 7 used for the idle stop function is pivotally supported by the ball bearings 10, 11, consequently, there is conventionally a problem in that impressions are easily formed on the outer rings 10b, 11b and inner rings 10c, 11c of the ball bearings 10, 11, and the life periods of the bearings are shortened.

The problem is not restricted in the electric pump in which the electric motor 7 and the auxiliary oil pump 8 are integrated with each other, and occurs similarly in the case where the single electric motor 7 is used. The problem is not restricted in the ball bearings 10, 11, and occurs similarly in the case where rolling bearings including various roller bearings are used. Furthermore, the problem is not restricted in the electric motor 7 used for the idle stop function, and occurs commonly in an electric motor for driving driven equipment which is sometimes in no use for a long term during when a vehicle travels.

It is an object of the invention to solve the problem in that, when an electric motor is not rotated for a long term during when a vehicle travels, the life period of a rolling bearing which pivotally supports the rotation shaft of the electric motor is shortened.

BRIEF SUMMARY OF THE INVENTION

The invention according to a first embodiment is characterized by a method of operating a vehicle electric motor which drives driven equipment via a rotation shaft that is pivotally supported by a rolling bearing, the electric motor is rotated at a very low speed or in an intermittent manner when a vehicle is traveling and the driven equipment is not used.

The invention according to a second embodiment is characterized in that the driven equipment is an auxiliary oil pump for supplying a hydraulic pressure of an ATF to a transmission, only at an idle stop of an engine.

It is not always necessary to independently detect a period when the vehicle is traveling, and that when the driven equipment is not used. In a usual idle stop function, for example, an idle stop controller or the like performs a control in which, when a vehicle is traveling, an auxiliary oil pump is not always used. Therefore, a judgment by the idle stop controller or the like whether the vehicle is traveling or not may be used as a judgment whether "the vehicle is traveling and the driven equipment is not used" or not.

According to the first embodiment of the invention of claim 1, when the vehicle is traveling so that there is a possibility that the rolling bearing receives vibrations, and when the driven equipment is not used and a rotation shaft of the electric motor is stopped, the electric motor is rotated at a low speed or in an intermittent manner. Even when the vehicle receives vibrations as a result of traveling, therefore, the rotation shaft is slightly rotated, and positions on raceway surfaces of balls or rollers of the rolling bearing are changed upon occasion. Consequently, there is no possibility that impressions are formed in the raceway surfaces, and it is possible to prevent the life period of the rolling bearing from being shortened. When the vehicle is not traveling, the rolling bearing does not receive vibrations, and hence the electric motor is not necessary to be rotated. When the driven equipment is not used, the electric motor is appropriately rotated, and hence it is not necessary to control the electric motor so as to be further rotated.

According to the second embodiment of the invention of claim 2, a rolling bearing of the electric motor for the auxiliary oil pump which operates only at an idle stop of the engine, and which, in another case, does not operate and continues to receive vibrations during traveling for a long term can be surely protected.

DETAILED DESCRIPTION OF THE INVENTION

Hereinafter, the best embodiment of the invention will be described.

Figure 3:
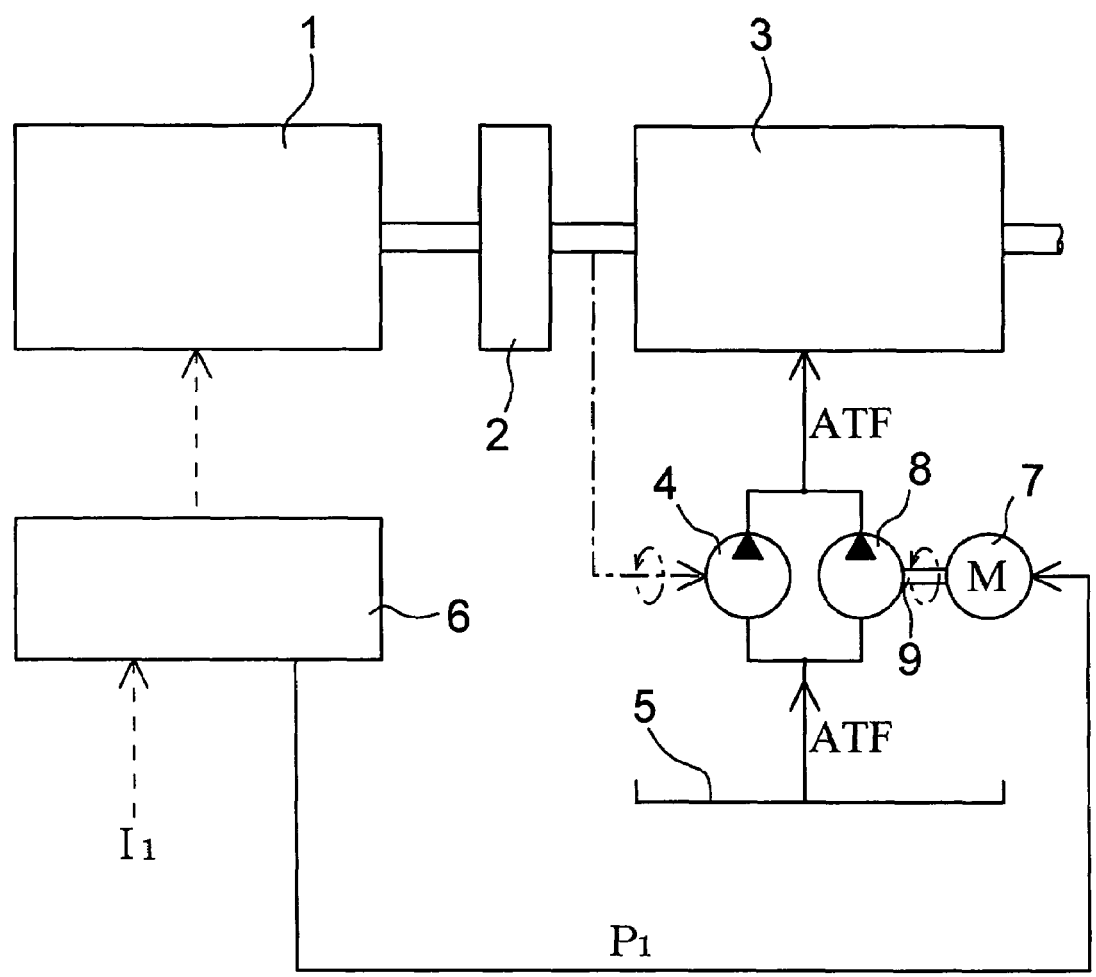
FIG. 3 is a block diagram showing a conventional example, and of a drive controller for an electric motor which drives an auxiliary oil pump for an idle stop.
Figure 4:
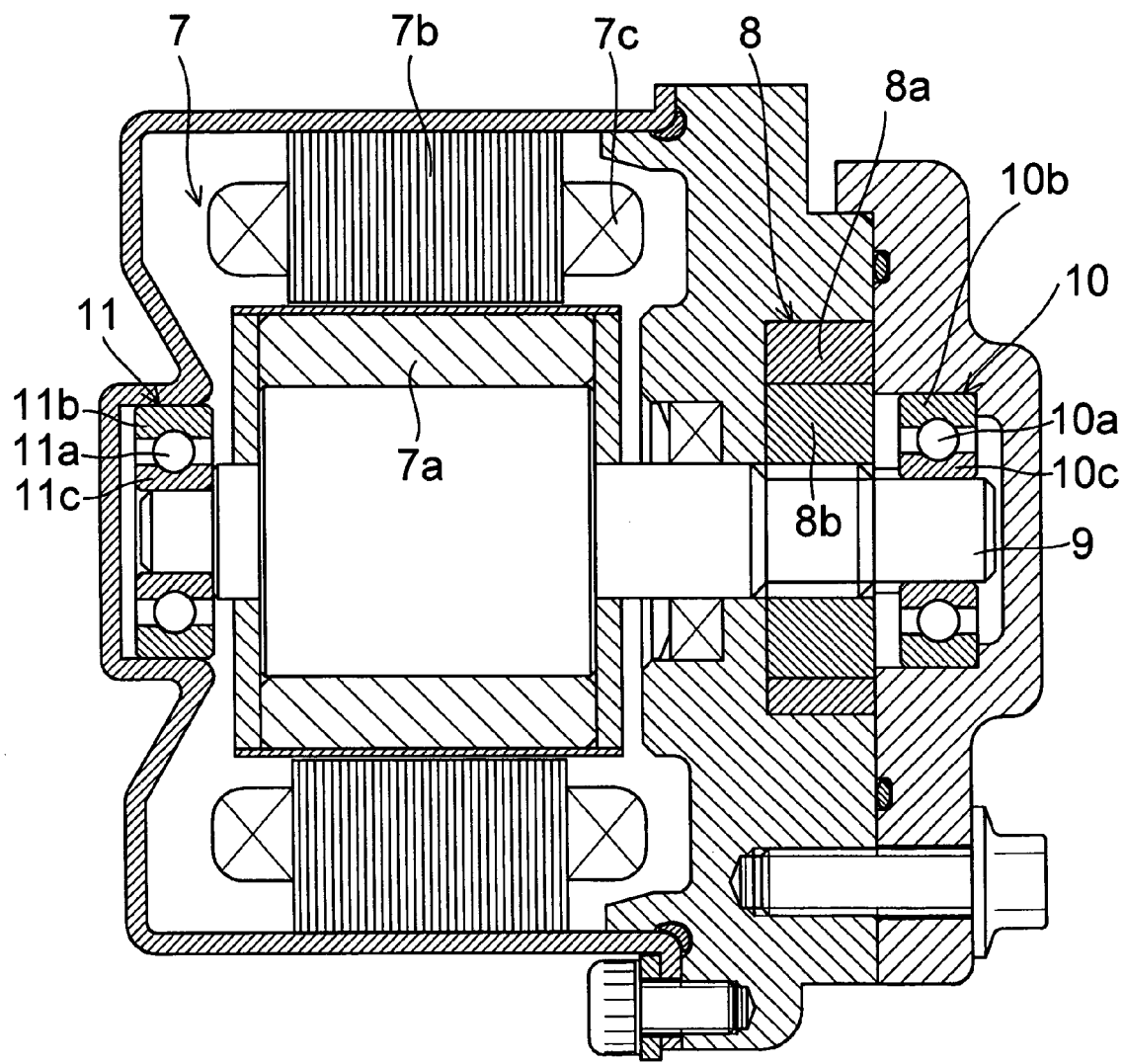
FIG. 4 is a longitudinal section side view illustrating the structure of an electric pump consisting of an auxiliary oil pump for an idle stop, and an electric motor for driving it.

The embodiment is a method of operating the electric motor 7 for the auxiliary oil pump 8 used in an idle stop function of an AT vehicle, and shown in FIG. 3. The electric motor 7 and the auxiliary oil pump 8 are integrated with each other with sharing the rotation shaft 9, as shown in FIG. 4.

Figure 1:
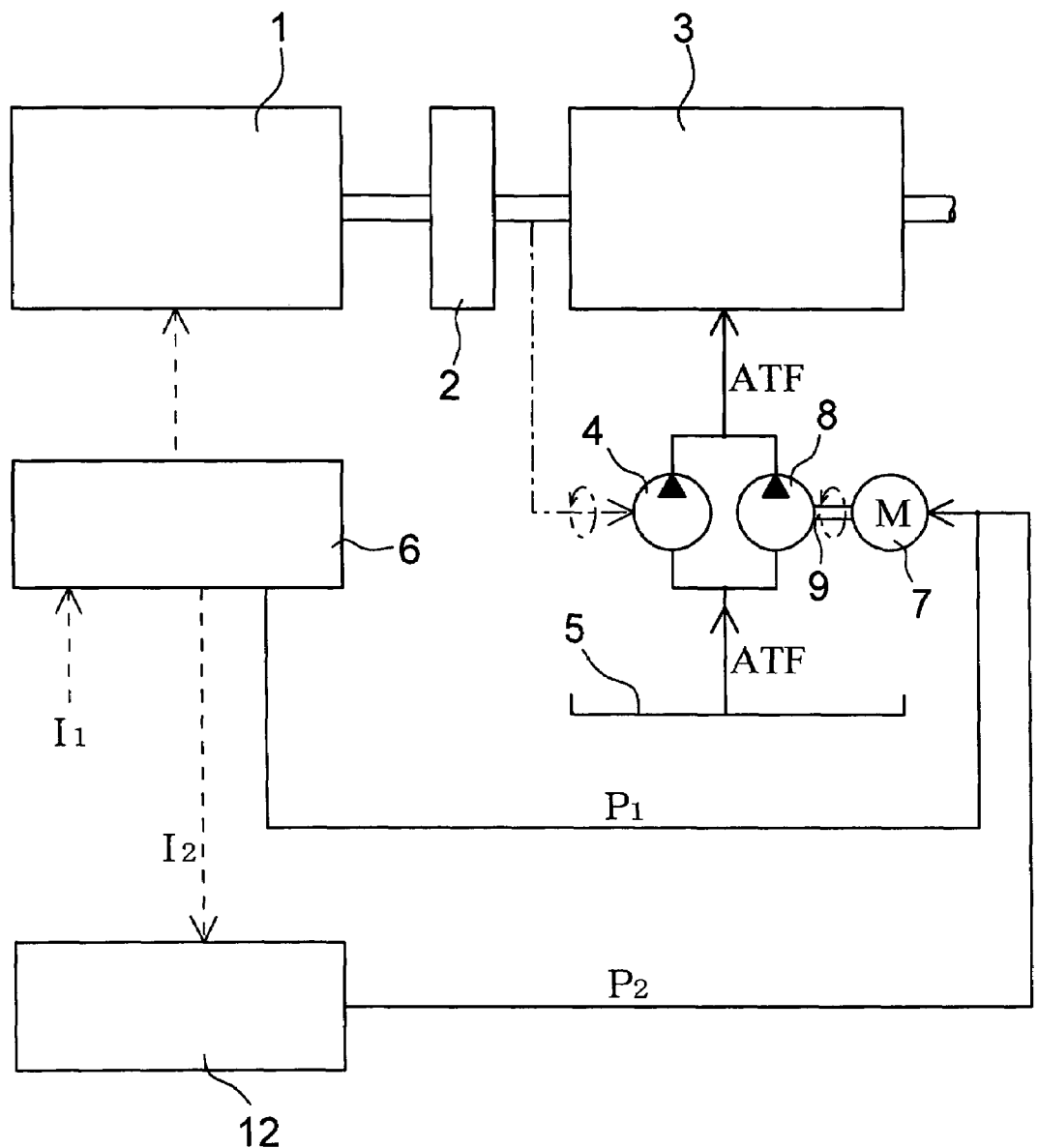
FIG. 1 is a block diagram showing an embodiment of the invention, and of a drive controller for an electric motor which drives an auxiliary oil pump for an idle stop.

Also in FIG. 1, the components having the same functions as those of the conventional example shown in FIG. 3 are denoted by the identical reference numerals. In the figure, the symbol $I_1$ indicates various kinds of drive information, 12 indicates in-traveling information, $P_1$ indicates a driving power source at an idle stop, and $P_2$ indicates a driving power source for protecting the ball bearings.

In the same manner as the case shown in FIG. 3, during when the vehicle is stopped, also the idle stop controller 6 of the embodiment shown in FIG. 1 stops the engine 1 on the basis of various kinds of drive information such as the travel speed of an automobile and a driving operation. Namely, the idle stop controller 6 does not stop the engine 1 during when the automobile is traveling. It is possible to judge whether the automobile is traveling or not, by detecting, for example, the travel speed of the automobile.

All cases where the automobile moves even at a slight degree may be judged as the traveling state. Alternatively, for example, only a case where the automobile travels at a speed more than a predetermined value may be judged as the traveling state, in order to exclude a predetermined initial time period of movement or traveling at a very low speed. In this case, judgment that the automobile is not traveling, i.e., the automobile is stopping includes cases where the automobile is traveling immediately after start of movement, and where the automobile is traveling at a speed lower than a predetermined value.

The traveling speed may be detected from a rotation speed of a driving wheel, a propeller shaft, or the like. Alternatively, the traveling speed may be calculated, for example, by detecting a magnetic marker of a position information system or a road, or the like, or by detecting and time-integrating the acceleration in the traveling direction of the automobile. The in-traveling information in which the idle stop controller 6 judges in this way whether the automobile is traveling or not is sent to a ball-bearing protection drive controller 12.

During when the automobile is stopping, only in the case of stopping due to, for example, a stoplight, a traffic jam, or other usual temporary stopping, the idle stop controller 6 stop the engine 1 by the idle stop function, and, in the case where the automobile is suddenly stopped, or where the burden of restart of the engine 1 is large, the idle stop controller does not stop the engine 1. When the engine 1 is stopped by the idle stop function, the idle stop controller 6 supplies the driving power source at an idle stop to the electric motor 7 for the auxiliary oil pump 8 to continuously rotate the electric motor 7.

When the engine 1 is stopped in this way, the supply of the ATF from the main oil pump 4 to the transmission 3 and the like is stopped. By rotating the electric motor 7, the auxiliary oil pump 8 provides substitution of the supply of the ATF. In the same manner as the conventional art, therefore, the hydraulic pressures of the transmission 3 and the like at an idle stop can be maintained.

In the embodiment, a sensorless motor is used as the electric motor 7. Therefore, a driver circuit for the sensorless motor detects the counter electromotive forces induced in the coils 7c of the stator shown in FIG. 4 to estimate the rotational position of the rotor, converts a DC power source to an alternate current by an inverter in accordance with the estimated rotational position, and supplies the alternate current to the coils 7c. Consequently, the idle stop controller 6 can rotate the electric motor 7 simply by supplying the DC power source to the driver circuit for the electric motor, and can perform also a speed control by changing the power source voltage. Furthermore, the speed control can be set also as a feedback control by obtaining information of rotation speed of the rotor from the driver circuit.

When receiving from the idle stop controller 6 the in-traveling information of judgment that the automobile is traveling, the ball-bearing protection drive controller 12 supplies the driving power source for protecting the ball bearings to the electric motor 7 for the auxiliary oil pump 8, to rotate the electric motor 7. The driving power source for protecting the ball bearings is a DC power source for performing intermittent rotation in which the electric motor 7 is rotated only for a short time period such as several seconds at relatively long time intervals such as several minutes.

Therefore, the driving power source for protecting the ball bearings is formed as pulses in which the duty ratio is very small, and, even when the power source is supplied for a long time, the power consumption is extremely small. Furthermore, even when the electric motor 7 is intermittently rotated in this way and the auxiliary oil pump 8 operates, the main oil pump 4 operates during traveling, and hence the supply of the ATF to the transmission 3 and the like is never affected.

As described above, the ball-bearing protection drive controller 12 causes the electric motor 7 to be intermittently rotated. When the in-traveling information from the idle stop controller 6 is switched to that of judgment that the automobile is stopping, the controller stops the supply of the driving power source for protecting the ball bearings. In accordance with this, also rotation of the electric motor 7 is stopped.

In the case where the idle stop controller 6 stops the engine 1 by the idle stop function, however, the driving power source at an idle stop is supplied, and hence the electric motor 7 is continuously rotated. In the case where the idle stop controller 6 does not stop the engine 1 even when the automobile is stopping, the main oil pump 4 supplies the ATF, and therefore the driving power source at an idle stop is not supplied to the electric motor 7.

Figure 2:
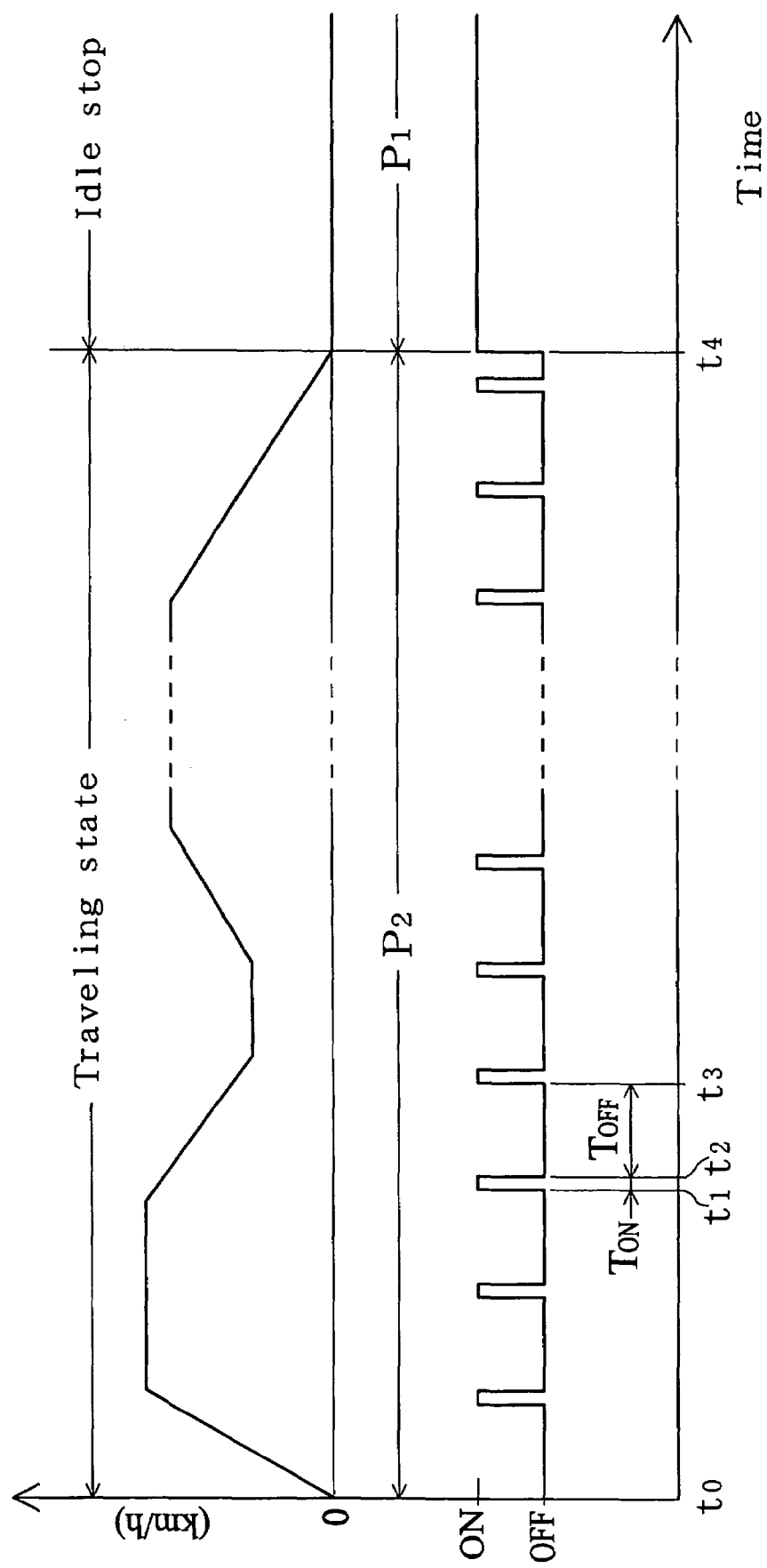
FIG. 2 is a time chart showing the embodiment of the invention, and a traveling state of an automobile, and a driving power source for supplying to the electric motor which drives the auxiliary oil pump for the idle stop.

According to the configuration, when the automobile starts and begins to travel at, for example, time $t_0$ shown in FIG. 2, the idle stop controller 6 sends the in-traveling information of judgment that the automobile is traveling, to the ball-bearing protection drive controller 12. Therefore, the ball-bearing protection drive controller 12 supplies the driving power source for protecting the ball bearings to the electric motor 7. The driving power source for protecting the ball bearings is a pulse-like DC power source which rotates (ON) the electric motor 7 for a short time period $T_{ON}$, for example, from time $t_1$ to time $t_2$, thereafter stops (OFF) the electric motor 7 for a relatively long tome time period $T_{OFF}$ from time $t_2$ to time $t_3$, and repeats this at intervals of period $T_{ON}+T_{OFF}$.

Even when the ball bearings 10, 11 which pivotally support the rotation shaft 9 of the electric motor 7 shown in FIG. 4 receive vibrations as a result of traveling of the automobile, therefore, the electric motor 7 is intermittently rotated, and the balls 10a, 11a change upon occasion their positions on the raceway surfaces of the outer rings 10b, 11b and the inner rings 10c, 11c. Consequently, there occurs no case where impressions are formed in the raceway surfaces.

In the case where, even when the electric motor 7 is repeatedly rotated only for the period $T_{ON}$, the balls 10a, 11a thereafter stop at the same positions on the raceway surfaces every time or periodically, the length of, for example, the time period $T_{ON}$ is slightly changed each time. In the case where the rotational angle of the rotor of the electric motor 7 can be detected, the control can be made so that, after rotation of the period $T_{ON}$, the rotational angle is distributed with being uniformly dispersed over the whole circumference.

When the automobile is gradually decelerated by depressing the brake pedal and stops at time $t_4$, the in-traveling information from the idle stop controller 6 is switched to that indicative of stopping, and hence the ball-bearing protection drive controller 12 stops the supply of the driving power source for protecting the ball bearings to the electric motor 7. The idle stop controller 6 judges such stopping as usual stopping due to a stoplight, a traffic jam, or the like, and therefore stops the engine 1 by the idle stop function and supplies the driving power source at an idle stop to the electric motor 7, so that the electric motor is continuously rotated after time $t_4$.

In the embodiment, the electric motor 7 for the auxiliary oil pump 8 which is used in the idle stop function has been described, and therefore the auxiliary oil pump 8 is always set not to be used when the automobile is traveling (however, the period when the auxiliary oil pump 8 is not used is not always the period when the automobile is traveling). Therefore, the ball-bearing protection drive controller 12 judged whether the driving power source for protecting the ball bearings is to be supplied to the electric motor 7, based on only the in-traveling information.

Depending on various hybrid vehicles, however, there is a case where, even when traveling, fuel injection is stopped during, for example, regenerative breaking to stop the engine 1. In this case, when the main oil pump 4 operates in accordance with only rotation of the engine 1, the main oil pump 4 is stopped also during traveling. In the same manner as the idle stop function, therefore, the necessity for rotating the electric motor 7 to cause the auxiliary oil pump 8 to operate arises. In such a case, consequently, even when traveling, a judgment whether the ball-bearing protection drive controller 12 is using the auxiliary oil pump 8 or not is made, so that, if not used, the driving power source for protecting the ball bearings is supplied to the electric motor 7.

It is a matter of course that, if not necessary even when the automobile is traveling, a driving mechanism for a wiper, a power window, or the like is not used for a long term. If necessary, it is used irrespective of whether the automobile is traveling or stopping. Moreover, the stop position in no use of the wiper, the power window, or the like is predetermined. Therefore, also the stop angle position of the rotation shaft of the electric motor which rotates the driving mechanism is constant, and there is the possibility that the burden on the ball bearings due to vibrations during traveling is particularly increased.

Therefore, the driven equipment which is rotated by the electric motor is not restricted to the auxiliary oil pump 8, and includes various equipment mounted on the automobile, such as driving mechanisms for the wiper, the power window, and the like. An electric motor which rotates such driven equipment must be usually controlled while independently detecting traveling of the automobile and no use of the driven equipment.

The no use of the driven equipment may include a case where the driven equipment is not required to operate, and that where it must not operate entirely or at a degree larger than a predetermined one. In the case of the auxiliary oil pump 8 which is shown in the embodiment, for example, it is set to no use when at least the engine 1 rotates, and in this situation it is not necessary to supply the ATF. By contrast, in a driving mechanism for the wiper, the power window, or the like, no use is set in the case where it is not manipulated so as to operate, and, in the no use, it must not operate basically.

In the embodiment, the case where the ball-bearing protection drive controller 12 controls the electric motor 7 so as to be intermittently rotated has been described. Since it is requested to sufficiently reduce the power consumption, the electric motor may be rotated at a very low speed. The very low speed means rotation in which the electric motor is rotated at a speed that is sufficiently lower than an average rotational speed of the electric motor in use of the driven equipment. Even in use of the driven equipment, there is a case where the electric motor is stopped momentarily or temporarily or rotated at an extremely low speed. Therefore, the very low speed is not always required to be lower than the minimum speed of the electric motor in use. In the case where the rotational speed in use has the lower limit and the minimum speed is a rotational speed which is sufficiently high, as in the case of the electric motor 7 in the embodiment, the very low speed is ought to be sufficiently lower than the minimum speed in order to save the electric power.

In the embodiment, the case where the electric motor 7 configured by a sensorless motor is used has been described. Another electric motor such as a brushless motor or an induction motor may be used. The driving power source for protecting the ball bearings which is supplied by the ball-bearing protection drive controller 12 is not restricted to a DC power source, and a power source corresponding to the kind of the electric motor is supplied.

Alternatively, in place of the supply of the driving power source to the electric motor, a control signal may be sent to the driver circuit, so that intermittent rotation or very low-speed rotation may be performed by a control of the driver circuit. This may be similarly applicable also to the driving power source of the idle stop controller 6 at an idle stop.

In the embodiment, the case where the supply of the ATF is not affected even when the electric motor 7 is rotated during traveling and the auxiliary oil pump 8 operates has been described. In a driving mechanism for the wiper, the power window, or the like, in no use, or when it is not manipulated so as to operate, the mechanism must not operate basically as described above. In such a driving mechanism, however, it is possible to rotate only the electric motor within the play range of a transmission apparatus. Therefore, the ball-bearing protection drive controller 12 may rotate the electric motor so as to repeatedly reciprocate within the range. Furthermore, there is a case where it is allowed to actually operate a wiper, a window glass, or the like within a range where passengers do not notice the movement. Therefore, the rotation may be conducted so as to repeatedly reciprocate within the range.

In the invention described above, the control is made while detecting that the automobile is traveling. Alternatively, an operating method may be employed in which an acceleration sensor is attached to an automobile or an acceleration sensor that has been already provided for another purpose is used, and, in the case where the acceleration is not smaller than a predetermined value, and driven equipment is in no use, an electric motor is rotated at a very low speed or in an intermittent manner. When such an acceleration sensor is used, it is possible to make a control, not during traveling in which there is the possibility of receiving vibrations, but only when actually receiving vibrations. Therefore, a situation in which the electric motor is rotated during traveling which is very smooth and vibration free to wastefully consume the electric power can be prevented from occurring.

In the embodiment, the acceleration sensor can optimumly detect only vibrations which may adversely affect the ball bearings 10, 11 pivotally supporting the rotation shaft 9 of the electric motor 7 and the auxiliary oil pump 8. Therefore, it is preferable to place the acceleration sensor in the vicinity of the transmission 3 or the electric motor 7 and the auxiliary oil pump 8, and it is preferable to dispose the sensor so as to detect an acceleration of the rotation shaft 9 in a radial direction.

In the embodiment, the case where the rotation shaft through which the electric motor rotates the driven equipment is pivotally supported by the ball bearings 10, 11 has been described. A place where impressions may be formed by vibrations is not restricted to the ball bearings 10, 11, and is commonly applied to a usual rolling bearing which uses rolling elements. The same is applicable also to various roller bearings.

In the embodiment, the electric pump in which the electric motor 7 and the auxiliary oil pump 8 share the rotation shaft 9 and are integrated with each other has been described. It is not necessary to integrate the electric motor and the driven equipment in this way. Alternatively, the rotation shaft of the electric motor may be coupled to the driven equipment via a joint or another transmission device.

In the embodiment, the automobile has been described. The invention can be embodied in any vehicle as far as the vehicle travels on a road or track and receives vibrations during traveling. It is not always restricted to a vehicle which comprises an engine as a source of power.

As described above, according to the invention, in the case where the driven equipment is not used and the rotation shaft of the electric motor is stopped, even when the vehicle receives vibrations as a result of traveling, the rotation shaft is slightly rotated, and positions on raceway surfaces of balls or rollers of the rolling bearing are changed upon occasion. Consequently, there is no possibility that impressions are formed in the raceway surfaces, and it is possible to prevent the life period of the rolling bearing from being shortened.

Furthermore, a rolling bearing of the electric motor for the auxiliary oil pump which operates only at an idle stop of an engine, and which, in another case, does not operate and continues to receive vibrations during traveling for a long term can be surely protected.

The invention claimed is:

1. A method of operating a vehicle electric motor which drives driven equipment via a rotation shaft that is pivotally supported by a rolling bearing, the method comprising the step of rotating said vehicle electric motor at a very low speed or in an intermittent manner when a vehicle is traveling and said driven equipment is not being used for operation of the vehicle.

2. A method of operating a vehicle electric motor according to claim 1, wherein said driven equipment is an auxiliary oil pump for supplying a hydraulic pressure of an ATF to a transmission, only at an idle stop of an engine.

3. A method of operating a vehicle electric motor according to claim 1 further comprising the step of rotating said vehicle electric motor at an idle stop of an engine of said vehicle at an average rotation rate that is greater than said very low speed, wherein said vehicle electric motor is rotated at said very low speed when said vehicle is traveling and said driven equipment is not being used for operation of said vehicle.

4. A method of operating a vehicle electric motor according to claim 3, wherein said driven equipment is an auxiliary oil pump supplying a hydraulic pressure of an ATF to a transmission at the idle stop of the engine.

5. A method of operating a vehicle electric motor which drives driven equipment via a rotation shaft that is pivotally supported by a rolling bearing, the method comprising the step of rotating said vehicle electric motor in an intermittent manner when a vehicle is traveling and said driven equipment is not being used for operation of the vehicle.

6. A method of operating a vehicle electric motor according to claim 5, further comprising the step of rotating the vehicle electric motor continuously when said vehicle is not traveling and said driven equipment is being used for operation of the vehicle.

7. A method of operating a vehicle electric motor according to claim 5, wherein a period of rotation of said vehicle electric motor is varied after each rotation in the step of rotating said vehicle electric motor in an intermittent manner.

8. A method of operating a vehicle electric motor according to claim 6, wherein the period of rotation of said vehicle electric motor is varied so that after rotation for the period of rotation a rotational angle of bearings in a raceway of said vehicle electric motor is distributed uniformly over the whole circumference of said raceway.

* * * * *